United States Patent
Holt et al.

(10) Patent No.: US 8,662,254 B2
(45) Date of Patent: Mar. 4, 2014

(54) HYDRAULIC-ASSISTED LUBRICATION SYSTEM AND METHOD

(75) Inventors: Joel Donnell Holt, Charlton, NY (US); Kevin Jon O'Dell, Rensselaer, NY (US)

(73) Assignee: General Electric Company, Schenectady, NY (US)

( * ) Notice: Subject to any disclaimer, the term of this patent is extended or adjusted under 35 U.S.C. 154(b) by 408 days.

(21) Appl. No.: 13/043,856

(22) Filed: Mar. 9, 2011

(65) Prior Publication Data

US 2012/0228063 A1 Sep. 13, 2012

(51) Int. Cl.
*F16N 13/16* (2006.01)
(52) U.S. Cl.
USPC .............................................. 184/29; 60/327
(58) Field of Classification Search
USPC .............................................. 417/16; 184/29
See application file for complete search history.

(56) References Cited

U.S. PATENT DOCUMENTS

| | | | | |
|---|---|---|---|---|
| 4,629,033 A | * | 12/1986 | Moore et al. ................... | 184/6.3 |
| 4,697,991 A | * | 10/1987 | Tsukahara et al. ............. | 417/219 |
| 4,848,186 A | | 7/1989 | Dorgan et al. | |
| 4,899,850 A | * | 2/1990 | Koller et al. ................... | 184/6.3 |
| 5,474,428 A | * | 12/1995 | Kimura et al. ................. | 417/16 |
| 5,769,182 A | * | 6/1998 | Parenteau ....................... | 184/6.4 |
| 6,390,947 B1 | * | 5/2002 | Aoki et al. ..................... | 477/3 |
| 6,505,711 B1 | * | 1/2003 | Zurcher et al. ................. | 187/285 |
| 6,688,434 B2 | * | 2/2004 | Johnson et al. ................ | 184/15.3 |
| 6,957,721 B2 | * | 10/2005 | Moser ............................ | 187/285 |
| 7,131,386 B1 | * | 11/2006 | Caldwell ........................ | 114/150 |
| 8,403,646 B2 | * | 3/2013 | Yoshinami ..................... | 417/2 |
| 2003/0059310 A1 | * | 3/2003 | Koenig et al. ................. | 417/16 |
| 2006/0070600 A1 | * | 4/2006 | Hara .............................. | 123/196 R |
| 2008/0308355 A1 | * | 12/2008 | Kakinami et al. ............. | 184/27.2 |

* cited by examiner

*Primary Examiner* — William A Rivera
*Assistant Examiner* — Michael Riegelman
(74) *Attorney, Agent, or Firm* — Hoffman Warnick LLC; Ernest G. Cusick

(57) ABSTRACT

In one embodiment, the invention provides a lubrication system for a machine comprising: a direct current (DC) motor; a battery system for powering the DC motor; a lubricating system in communication with the DC motor, the lubricating system including a supply of lubricating oil and a pump for delivering the lubricating oil to at least one component of the machine requiring lubrication; a hydraulic motor operably coupled to a shaft of the DC motor; a supply of a pressurized fluid in communication with the hydraulic motor; and a control device for discharging the supply of pressurized fluid into the hydraulic motor to power the hydraulic motor, whereby the hydraulic motor, when powered by the supply of pressurized fluid, is operable to turn the shaft of the DC motor, thereby reducing an operating current supplied to the DC motor by the battery system.

9 Claims, 7 Drawing Sheets

HYDRAULIC-ASSISTED LUBRICATION SYSTEM AND METHOD

BACKGROUND OF THE INVENTION

Many turbines and similar machines include failsafe lubrication systems designed to ensure proper lubrication of critical components in the event of a power failure. Without such lubrication, the turbine or its component parts may be severely damaged or destroyed as they continue to rotate unpowered.

For example, FIG. 1 shows a known lubrication system 100 including a single-shaft DC motor 110, a pump 132, and a lubricating oil supply 134 designed to deliver the lubricating oil to critical components, such as bearings. DC motor 110 and pump 132 are in communication via the motor shaft 114. Similarly, lubricating oil is delivered from lubricating oil supply 134 to pump 132 and to bearings or similar components via supply lines 136, 138, respectively.

Often, DC motor 110 has a high inrush current, requiring its connection 112 to a large DC power supply 120. This necessarily increases the initial expense as well as the continued maintenance of the system. As shown in FIG. 1, DC power supply 120 is shown including four DC batteries 122, 124, 126, 128. This is merely for the sake of comparison, however, as will be apparent from the discussion below. The relative size of the DC power supplies described may vary in the number of batteries and/or their respective sizes.

BRIEF DESCRIPTION OF THE INVENTION

Embodiments of the invention relate generally to lubrication systems for turbines and similar machines and, more particularly, to a lubrication system employing a hydraulic motor powered by a high-pressure fluid capable of assisting in the startup of a direct current (DC) motor, as well as methods for operating such a lubrication system.

In one embodiment, the invention provides a lubrication system for a machine comprising: a direct current (DC) motor; a battery system for powering the DC motor; a lubricating system in communication with the DC motor, the lubricating system including a supply of lubricating oil and a pump for delivering the lubricating oil to at least one component of the machine requiring lubrication; a hydraulic motor operably coupled to a shaft of the DC motor; a supply of a pressurized fluid in communication with the hydraulic motor; and a control device for discharging the supply of pressurized fluid into the hydraulic motor to power the hydraulic motor, whereby the hydraulic motor, when powered by the supply of pressurized fluid, is operable to turn the shaft of the DC motor, thereby reducing an operating current supplied to the DC motor by the battery system.

In another embodiment, the invention provides a method comprising: providing a machine including a direct current (DC) motor and a hydraulic motor operatively coupled to a shaft of the DC motor; accumulating a supply of a pressurized fluid; in response to a loss of alternating current (AC), a drop in lubricating oil pressure in the machine, or both, discharging the supply of pressurized fluid into the hydraulic motor, thereby turning a shaft of DC.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
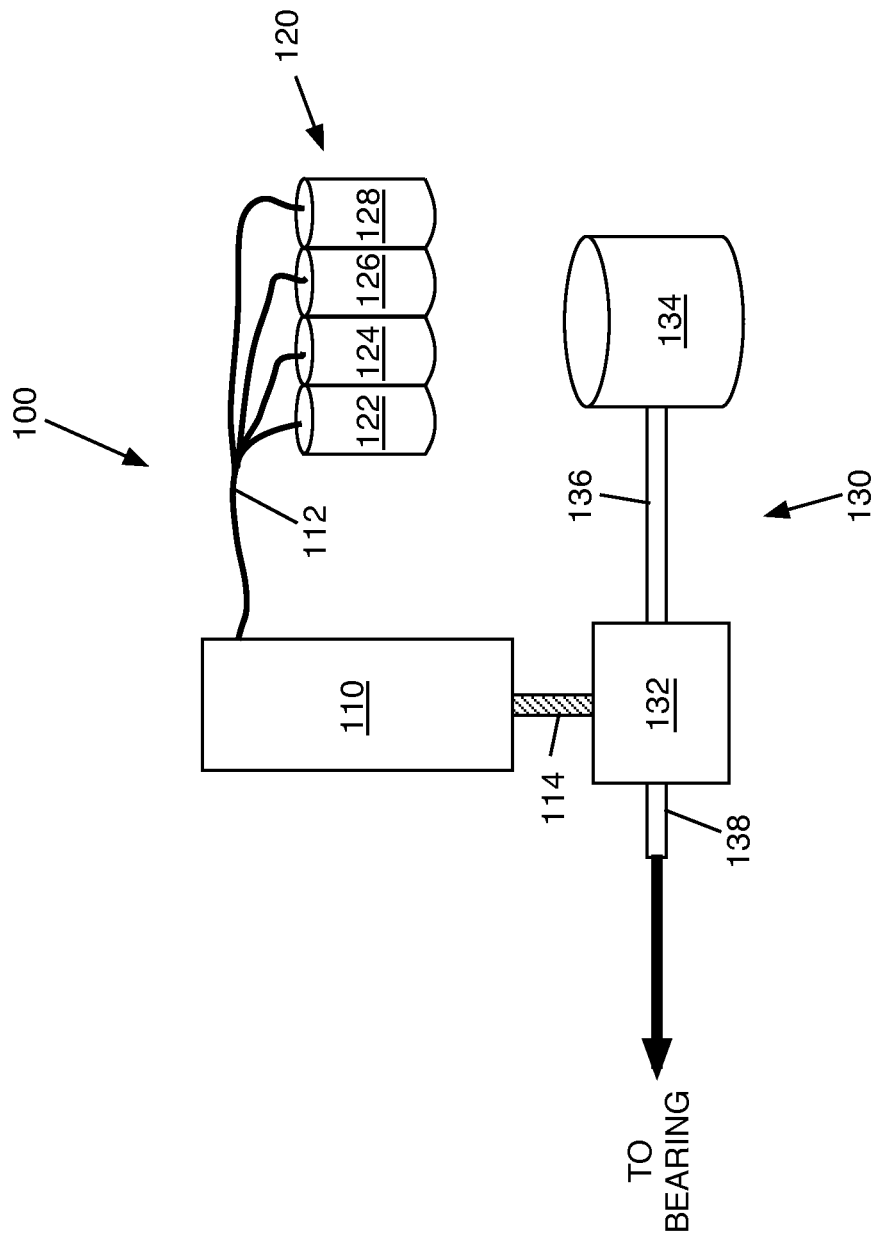
FIG. 1 shows a schematic view of a known lubrication system.
Figure 2:
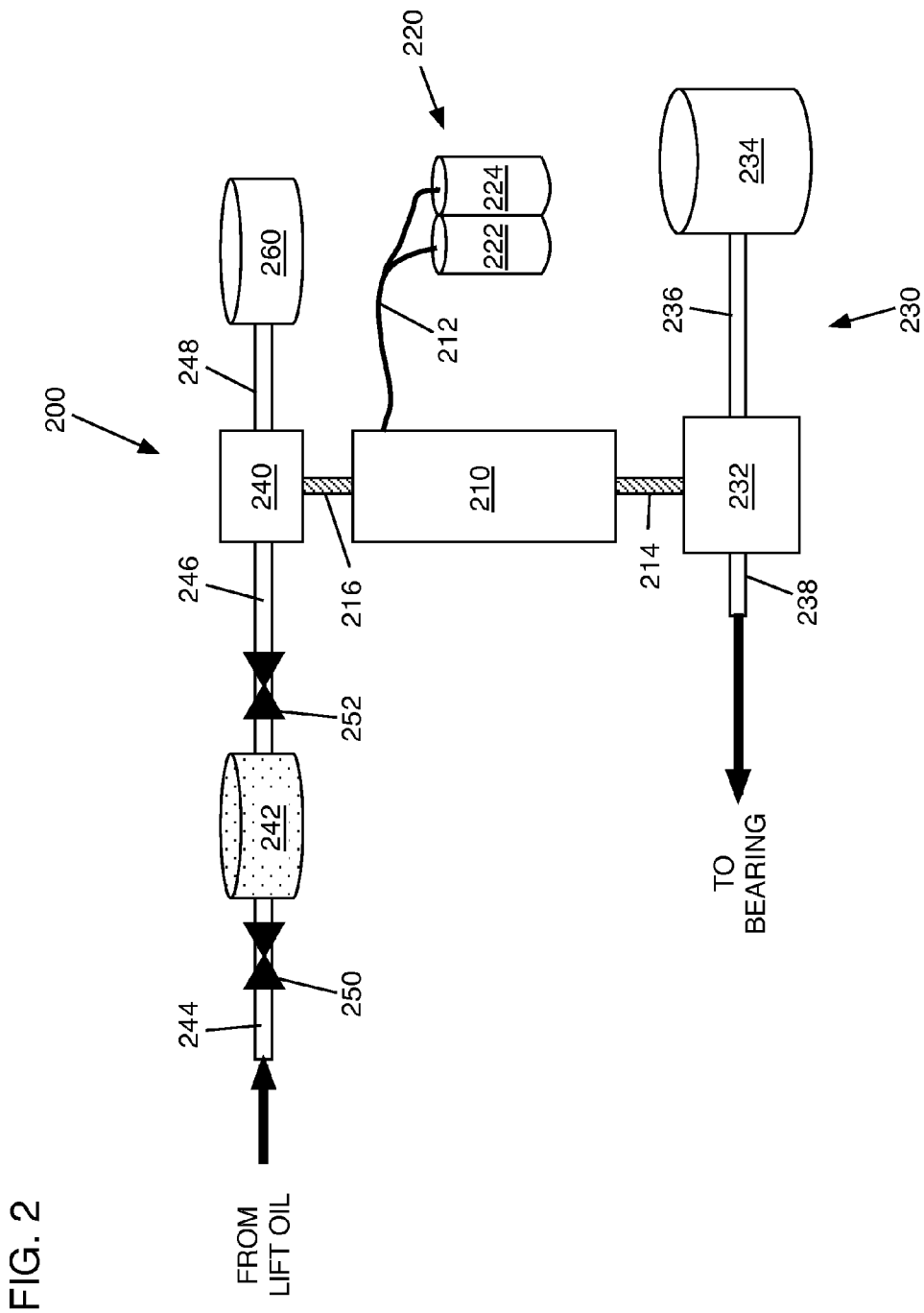
FIGS. 2-4 show schematic views of a lubrication system according to an embodiment of the invention.

Referring now to FIG. 2, a lubrication system 200 according to an embodiment of the invention is shown. Here, DC motor 210 is a double-shaft motor with a first end 214 operatively coupled with pump 232 and a second end 216 operatively coupled with a hydraulic motor 240. Hydraulic motor 240 is disposed between an accumulator 242 for holding a supply of high-pressure fluid and a fluid return 260. As shown in FIG. 2, the high-pressure fluid includes lift oil which, when pressurized within a machine, such as a turbine system, typically has a pressure between about 3000 pounds per square inch (PSI) and about 3500 PSI, i.e., between about 210 kg/cm and about 246 kg/cm. Other high-pressure fluids, such as lubricating oil, may be similarly employed. Such high-pressure fluids will typically have pressures between about 2000 PSI and about 4000 PSI, i.e., between about 140 kg/cm and about 281 kg/cm.

Control devices 250, 252 adjacent accumulator 242 permit storage of the fluid at high pressure, which may then be released into and power hydraulic motor 240. For example, as shown in FIG. 2, both control devices 250, 252 are closed, with a supply of lift oil stored at high pressure in accumulator 242.

Figure 3:
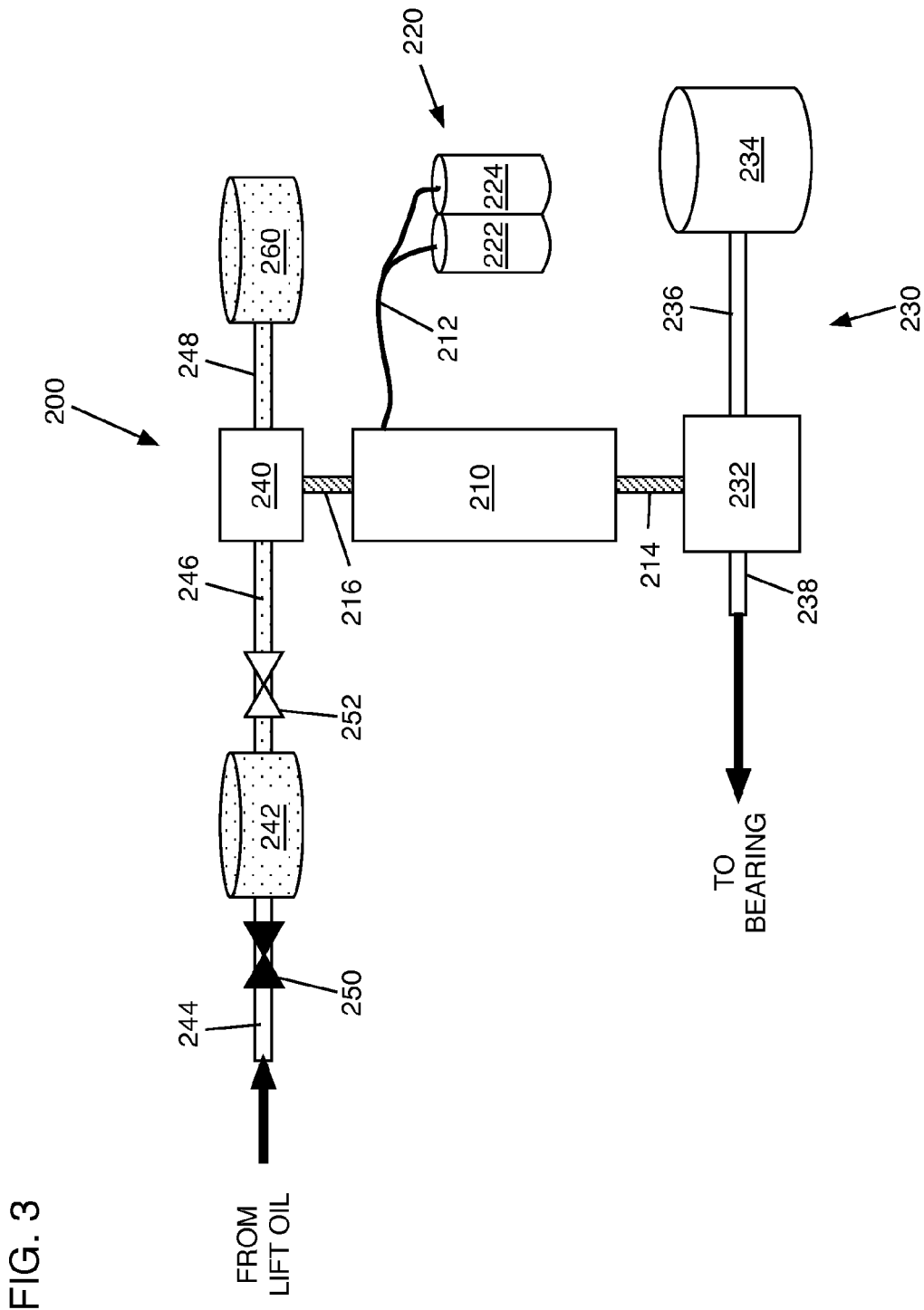

In FIG. 3, control device 252 between accumulator 242 and hydraulic motor 240 has been opened, releasing high-pressure lift oil through supply line 246, into hydraulic motor 240, into supply line 248 and, ultimately, to fluid return 260. Fluid return 260 may simply be the supply of lift oil for the machine. In other embodiments of the invention, fluid return 260 may include a dedicated supply of fluid capable of high pressurization.

In any case, the release of high-pressure lift oil into hydraulic motor 240 causes turning of second end 216 of the motor shaft of DC motor 210. This hydraulic-assisted start of DC motor 210 permits a reduction in the size of the DC power supply 220, as shown in FIG. 3.

In some embodiments of the invention, control device 252 includes a solenoid valve operable to open in response to a loss of AC power, a drop in lubricating oil pressure in the machine, or some other indicator that lubricating oil may be required by one or more components, such as a bearing.

Figure 4:
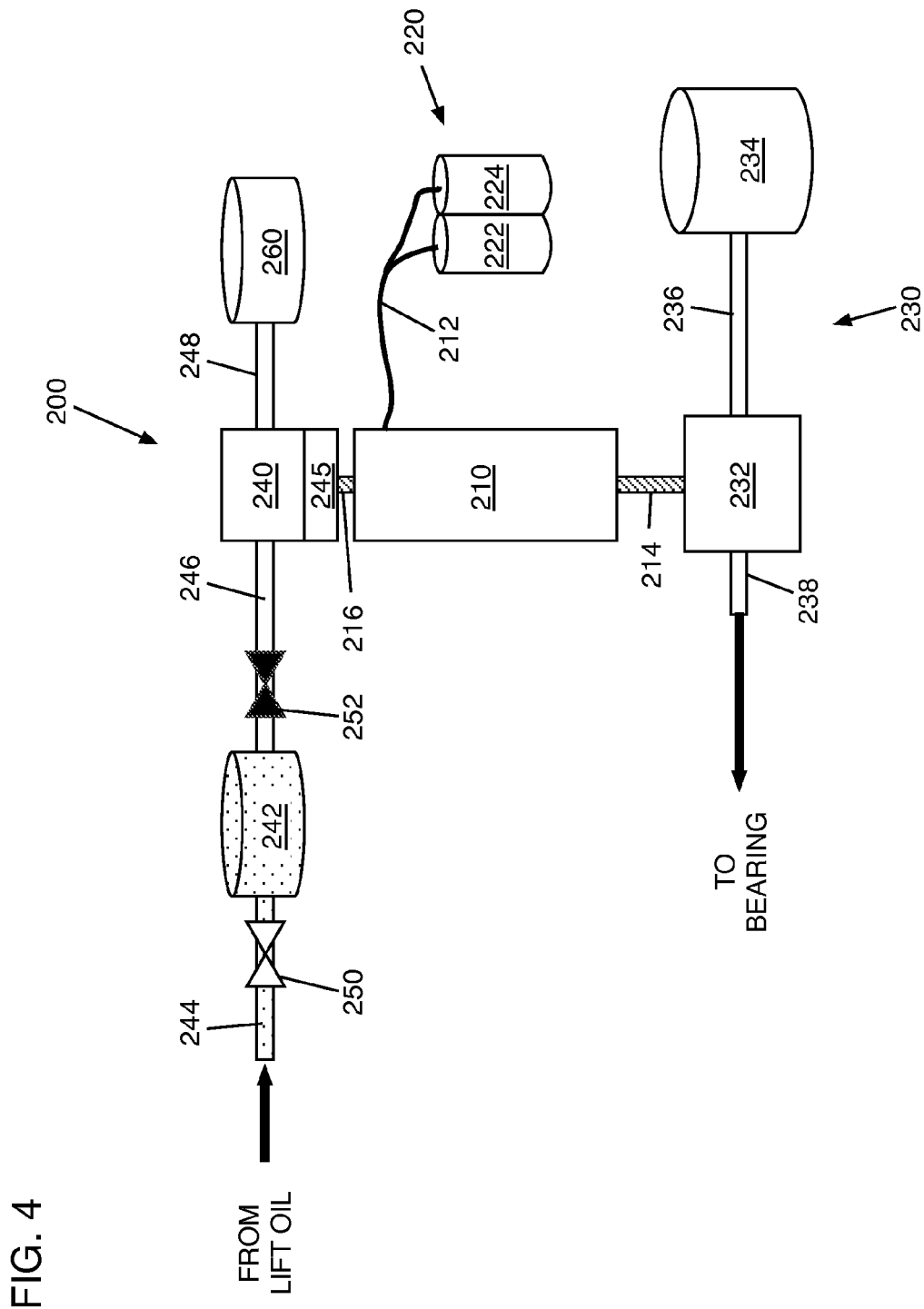

FIG. 4 shows lubrication system 200 during normal operation of the machine. Here, control device 250 is open and control device 252 is closed, such that high-pressure lift oil, which is maintained at high-pressure by a separate lift oil pumping mechanism, may be added to and stored in accumulator 242. Once a sufficient supply of high-pressure lift oil (or other high-pressure fluid, in other embodiments of the invention) is accumulated, control device 250 may be closed.

In some embodiments of the invention, hydraulic motor 240 may include a clutch system 245 for alternately engaging and disengaging hydraulic motor 240 from second end 216 of the DC motor shaft. Such a clutch system 245 may be used, for example, to avoid cavitation in or damage to hydraulic motor 240 once DC motor 10 is running at speed and the supply of high-pressure lift oil has passed through hydraulic motor 240.

Figure 5:
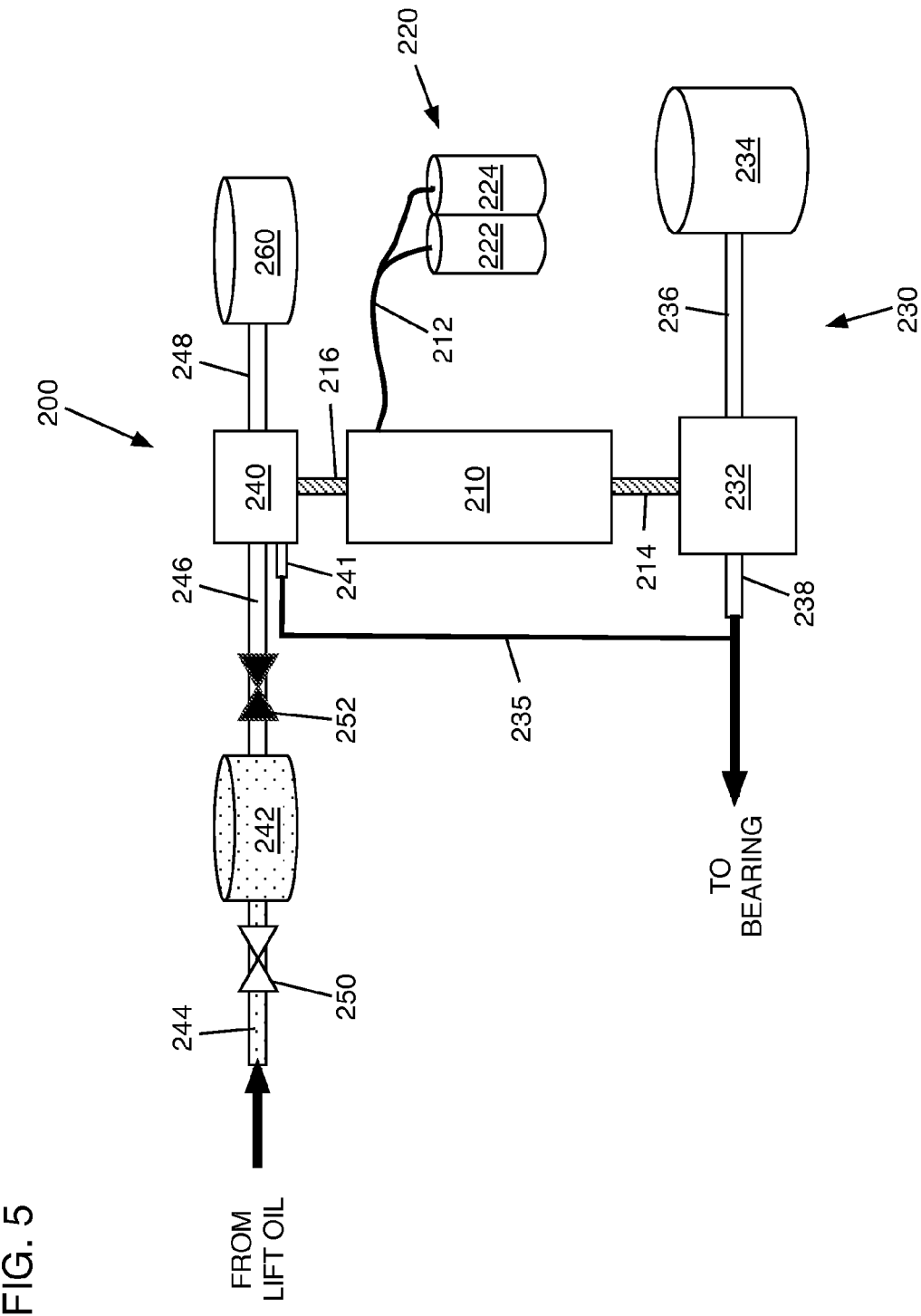
FIG. 5 shows a schematic view of a lubrication system according to another embodiment of the invention.

In other embodiments of the invention, such as that shown in FIG. 5, a portion 235 of lubricating oil supply 234 may be diverted from supply line 238 to an input 241 of hydraulic motor 240 to provide continued lubrication and avoid cavitation in or damage to hydraulic motor 240.

Figure 6:
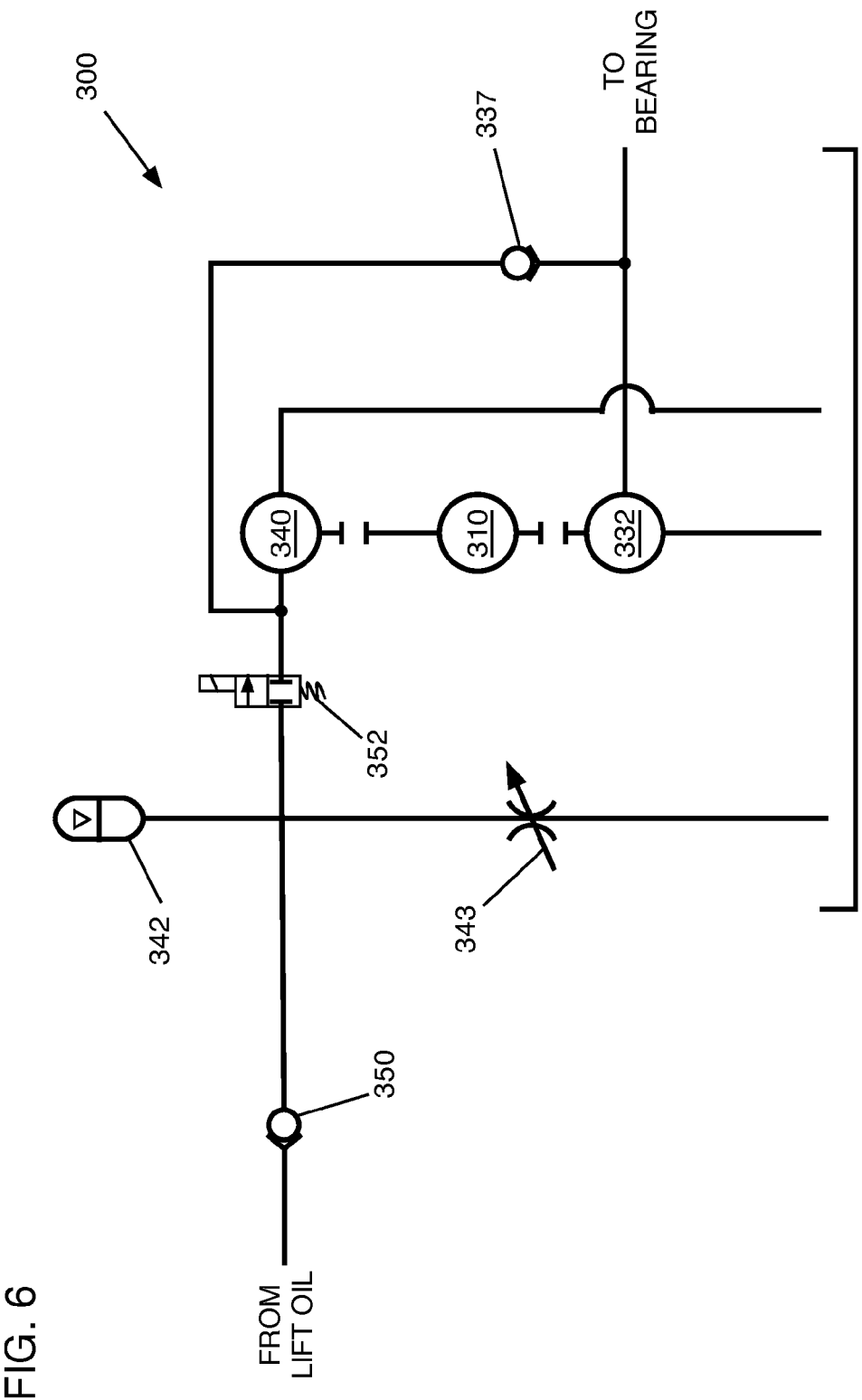
FIG. 6 shows a hydraulic schematic of a lubrication system according to an embodiment of the invention.

FIG. 6 shows a schematic of a lubrication system 300 according to an embodiment of the invention. Here, control device 352 includes a solenoid valve. More specifically, control device 352 is a two position, two way, normally closed direct solenoid valve with a spring return. A control valve 350 controls the flow of lift oil into accumulator 342. Similarly, control valve 337 controls the flow of lubricating oil from pump 332 to hydraulic motor 340. A needle valve 343 acts to safely drain the system if maintenance is required.

In some embodiments of the invention, an operating current of the DC motor is reduced by between about 80% and about 50%, as compared to known systems. For example, in known systems, an inrush current is typically between twice and five times the current necessary to operate a machine as it is operated at steady state or cycled down. Embodiments of the invention effectively reduce the inrush current, and therefore the operating current of the DC motor, to between about the operating current and about 2.5 times the operating current of the machine. In some embodiments of the invention, the operating current is between about 150 amperes and about 400 amperes.

In some embodiments of the invention, the operating voltage is between about 100 volts and about 250 volts. One skilled in the art will recognize, however, that these values are representative only of illustrative machines and lubrication systems including typically-sized DC motors.

Figure 7:
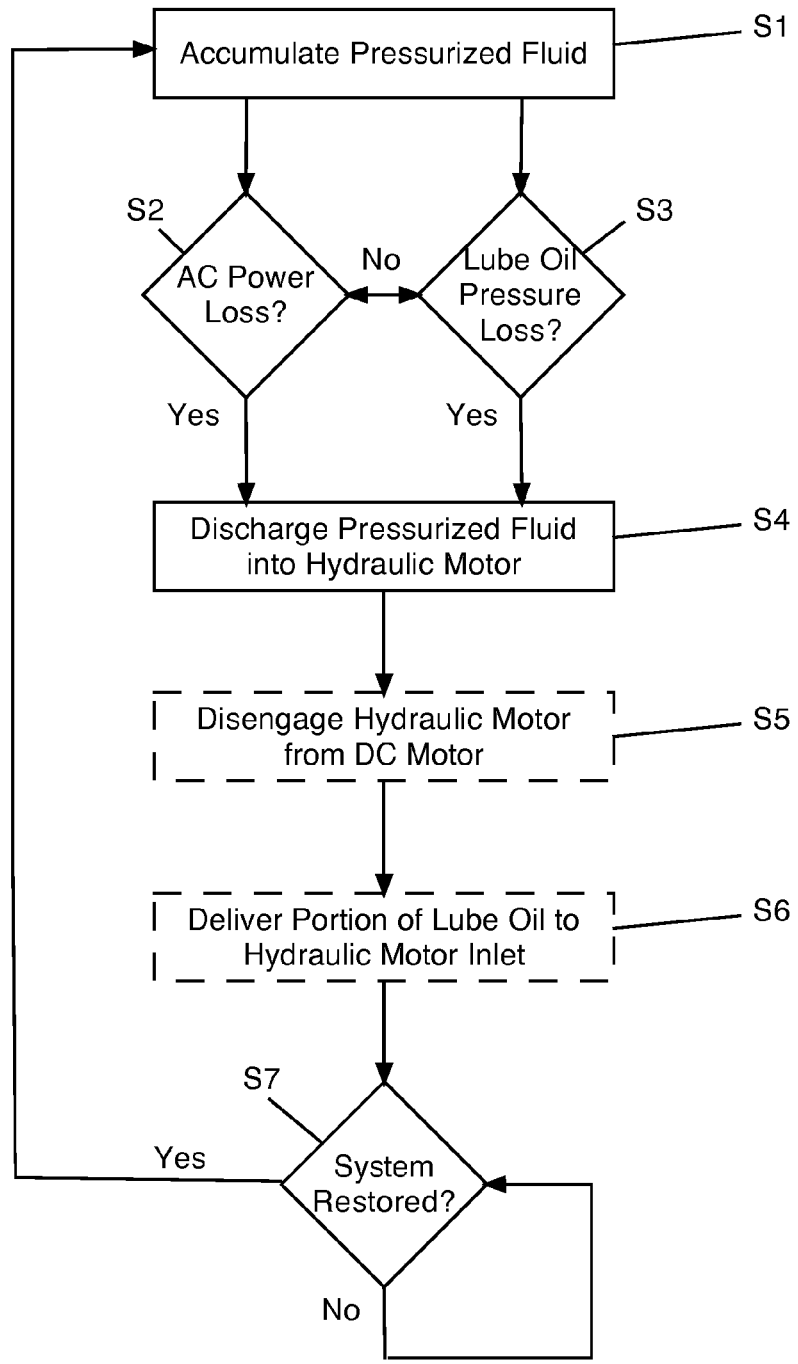
FIG. 7 shows a flow diagram of a method according to an embodiment of the invention.

FIG. 7 shows a flow diagram of a method according to an embodiment of the invention. At S1, a pressurized fluid, such as lift oil, is accumulated. In response to a loss of AC power at S2, a loss of lubricating oil pressure (e.g., a drop in lubricating oil pressure below a predetermined threshold) at S3, or both, the pressurized fluid is discharged into a hydraulic motor at S4. As described above, the hydraulic motor is operable to turn a shaft of a DC motor with which it is coupled. The DC motor, in turn, powers a pump to deliver lubricating oil to a component requiring lubrication.

At S5, the hydraulic motor may optionally be disengaged from the DC motor. Also optionally, at S6, a portion of lubricating oil may be delivered to an inlet of the hydraulic motor. As noted above, either of these actions may be taken to avoid cavitation in or damage to the hydraulic motor, which may occur after the supply of pressurized fluid is exhausted.

At S7, it is determined whether the system has been restored to its original state (e.g., AC power and/or lubricating oil pressure has been regained). If the original state has been restored, flow may return to S1, and the pressurized fluid re-accumulated. If not, S7 may be looped until such time that the system has been restored to its original state.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lubrication system for a machine comprising:
   a direct current (DC) motor;
   a battery system for powering the DC motor;
   a lubricating system in communication with the DC motor, the lubricating system including a supply of lubricating oil and a pump for delivering the lubricating oil to at least one component of the machine requiring lubrication, the pump being connected to a first end of a shaft of the DC motor;
   a hydraulic motor operably coupled to a second end of the shaft of the DC motor and wherein the DC motor is positioned between the first and second end of the shaft;
   a clutch system for alternately engaging and disengaging the hydraulic motor from the second end of the shaft of the DC motor;
   a supply of a pressurized fluid in communication with the hydraulic motor; and
   a control device for discharging the supply of pressurized fluid into the hydraulic motor to power the hydraulic motor,
   whereby the hydraulic motor, when powered by the supply of pressurized fluid, is operable to turn the shaft of the DC motor, thereby reducing an operating current supplied to the DC motor by the battery system.

2. The lubrication system of claim 1, wherein the at least one component of the machine requiring lubrication includes a bearing.

3. The lubrication system of claim 1, wherein the supply of pressurized fluid has a pressure between about 140 kg/cm and about 281 kg/cm.

4. The lubrication system of claim 1, wherein the pressurized fluid includes lift oil.

5. The lubrication system of claim 4, wherein the lift oil has a pressure between about 210 kg/cm and about 246 kg/cm.

6. The lubrication system of claim 1, wherein the control device includes a solenoid valve operable to discharge the supply of pressurized fluid.

7. The lubrication system of claim 1, further comprising:
   a supply line between the lubricating system and the hydraulic motor for delivering a portion of the supply of lubricating oil to an inlet of the hydraulic motor.

8. The lubrication system of claim 1, wherein an operating current of the machine is between about 150 amperes and about 400 amperes.

9. The lubrication system of claim 1, wherein the operating current is reduced by between about 80% and about 50%, as compared to an unreduced operating current required without the hydraulic motor.

* * * * *